No. 893,992. PATENTED JULY 21, 1908.
W. G. & F. W. FUESSEL.
LEVEL.
APPLICATION FILED MAR. 5, 1908.
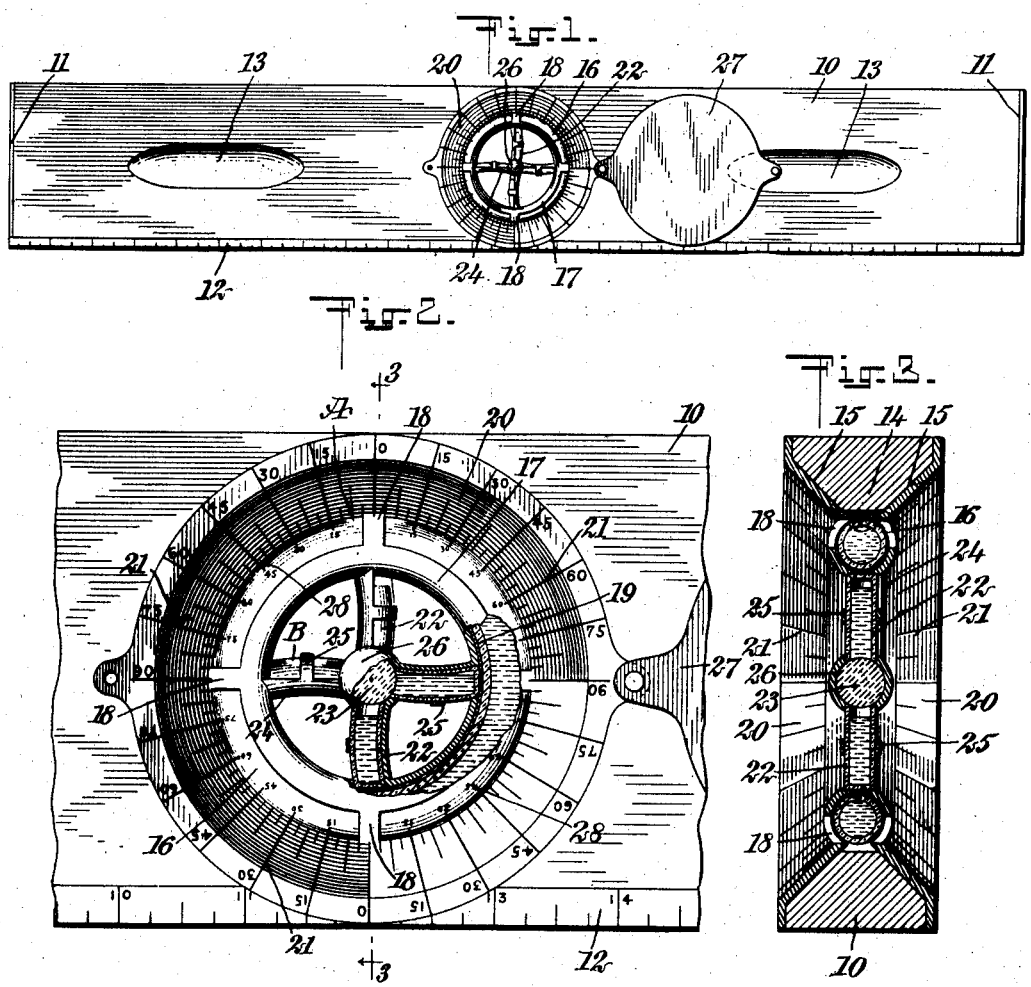
WITNESSES
INVENTORS
Wilson G. Fuessel
Frank W. Fuessel
BY
ATTORNEYS

UNITED STATES PATENT OFFICE.

WILSON GEORGE FUESSEL AND FRANK WRIGHT FUESSEL, OF HICKSVILLE, NEW YORK.

LEVEL.

No. 893,992.   Specification of Letters Patent.   Patented July 21, 1908.

Application filed March 5, 1908. Serial No. 419,289.

*To all whom it may concern:*

Be it known that we, WILSON GEORGE FUESSEL and FRANK WRIGHT FUESSEL, both citizens of the United States, and residents of Hicksville, in the county of Nassau and State of New York, have invented a new and Improved Level, of which the following is a full, clear, and exact description.

This invention relates to levels, and more particularly to devices of this kind used for determining the inclination to the horizontal, of different surfaces, and comprising a plurality of spirit tubes, one of which is annular and which encompasses a plurality of radially disposed spirit tubes, and a scale graduated in angular degrees and arranged to coöperate with the annular tube for the determination of the inclination in degrees.

An object of the invention is to provide a device of the class described, which is simple, strong and durable in construction, which is inexpensive to manufacture, and by means of which the inclination to the horizontal of objects and surfaces, can be readily and accurately determined.

A further object of the invention is to provide a level having spirit tubes in which a bubble in a fluid serves for the determination of the angular position of the level, which responds instantly to alterations in position, and which has a coöperating scale graduated in angular degrees, to permit the determination in degrees, of the inclination of the level to the horizontal.

A still further object of the invention is to provide a level, the spirit tubes of which can be seen from both sides of the level body, and in which the spirit tubes are independent and are thus capable of indicating independently of one another, the inclination of the level body, thus permitting exceptionally accurate work with the device.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which Figure 1 is a side elevation of our invention; Fig. 2 is an enlarged side elevation showing the spirit tube partly in section, and the scales for determining the inclination; and Fig. 3 is a transverse section on the line 3—3 of Fig. 2.

Before proceeding to a more detailed explanation of my invention, it should be clearly understood that the same pertains specifically, to levels in which spirit tubes are used. In devices of this kind, a transparent tube is partly filled with a fluid, so that a bubble is formed, and the position of this bubble in the tube determines the horizontal or other position of the level. It will of course, be understood, that any fluid other than spirit, adapted to the purpose, can be employed as well, and the term "spirit" is used merely for convenience. We provide among others, an annular spirit tube, which has coöperating therewith an annular scale divided into quadrants, each of which is graduated in degrees from zero to 90. The arrangement is such that when the level body is in a horizontal position, the bubble in the annular spirit tube will read at one of the zero graduations. When the level body is tilted in one direction or the other the bubble will move correspondingly in the annular tube, and will then read at one of the other graduations corresponding to the angle in degrees, which the body then makes with the horizontal. The annular spirit tube is arranged in an opening of the level body and can thus be seen from both sides of the same. At each side of the body is arranged one of the graduated scales to permit the reading of a scale at both sides of the level body. Embraced by the annular spirit tube are four radially disposed spirit tubes, each slightly curved in the usual manner, and each independent of the other and of the annular tube. The bubble in each of these radial tubes can be used for rapid determinations of angularity, and for ascertaining whether or not the level body is horizontally positioned. There are no scales coöperating with these radial spirit tubes, but their arrangement is such that one of them is always in an operative position, and is available for immediate use.

Referring more particularly to the drawings, 10 represents the level body, which may be fashioned from any suitable material, preferably wood, and of the usual elongated form. At the extremities, the body has the customary brass ends 11, and if so desired, it may be provided at one edge with a linear scale 12. In the sides it has grooves or recesses 13 to permit its manual operation or handling without difficulty. We wish to emphasize that the details of construction such as those described for example, above, form no part of our invention, and that we can vary these to suit individual preference or special conditions.

Substantially near the middle of the level body, is an opening 14 therethrough having the opposite edges 15 outwardly beveled. An annular tube 16 is arranged within the opening 14, and at the inner side has a ring 17 of substantially semi-circular cross-section. The ring 17 may be fashioned from brass or any other suitable material, and engages the tube 16 to hold it in position. The ring 17, at a number of points, has extensions 18 which encompass the tube. The ring itself extends partly around the tube 16 and permits the bubble A formed by the fluid within the tube, to be easily seen at all points of the latter. Between the ring 17 and the inner side of the tube 16, a layer 19 of plaster of paris or the like, may be inserted to hold the ring firmly in position within the tube. The latter may be of any transparent material, preferably glass.

At each of the beveled edges 15 of the opening 14 are placed annular scales 20 fashioned from metal or any othe suitable material, and suitably formed to fit into the opening. The extensions 18 of the ring 17 may be secured to the scales 20 in any suitable manner, for example, by means of soldering, or if so desired, the ring 17 can be formed integral with one of the scales 20 and be attached thereto through the extensions 18. The ring and its extensions, at the side remote from the scale 20 with which the ring is integral, can be suitably disposed to permit the positioning of the tube about the ring 17, and can be subsequently bent to hold the tube in place. The scales 20 are divided into quadrants each of which has indicated thereon graduations 21, representing degrees from zero to 90. These graduations may be engraved or otherwise suitably marked on the scales, and indicating figures may be likewise inscribed thereon, as shown, for example, in Fig. 2.

Within the ring 17 are located four transparent radial spirit tubes 22, each of which is slightly curved to facilitate the movement of the spirit bubble B therein, in accordance with the usual practice. The inner ends of the tubes 22 are sealed by a common ball or plug 23 of any suitable material such as plaster of paris. Each of the tubes 22, at one side, has a support 24 of substantially semi-circular cross-section and provided with an extension 25 encompassing the tube. Each of the supports 24 permits its tube 22 to be seen throughout its length, so that the position of each of the bubbles B can be easily determined. The plug 23 is incased in a suitable cover 26. The supports 24 are soldered or otherwise fastened to the ring 17 and the cover 26. They are arranged at the same sides of the tubes 22, as is shown most clearly in Fig. 2.

We provide pivoted covers 27 at each side of the body, which can be swung into position to protect the spirit tubes when the device is not in use. If so desired, the covers may have inscribed thereon a scale showing the elevation in degrees corresponding to the angular position of the level and depending upon the dimensions of the same; for example, an elevation of one inch in the length of the level equals 5 degrees.

For rapid and approximately correct work we provide the tube 16 with graduations 28 and indicating figures; for instance, as shown, a graduation for every 5 degrees. The graduations and figures may be etched upon the glass or inscribed in any other convenient manner.

Having thus described our invention, we claim as new and desire to secure by Letters Patent:

1. In a level, a plurality of angularly disposed independent spirit tubes, and common means for sealing the ends of said tubes.

2. In a level, a plurality of angularly disposed independent spirit tubes radiating from a common point, and at the common point, a plug for sealing the adjacent ends of all of said tubes.

3. In a level, an annular transparent spirit tube, and arranged radially with respect thereto, an independent spirit tube, and common means for mounting said tubes in position.

4. In a level, an annular transparent spirit tube, arranged radially with respect thereto and encompassed thereby, a plurality of independent spirit tubes, common means for sealing the adjacent ends of said radial tubes, and rigidly connected means for holding said annular tube and said radial tubes.

5. In a level, an annular transparent spirit tube, an independent spirit tube arranged radially with respect to said annular spirit tube, and a scale arranged to coöperate with said annular spirit tube and serving for the determination of angular positions of the level.

6. In a level, an annular spirit tube, a plurality of independent spirit tubes arranged radially with respect to said annular spirit tube, and an annular scale concentric with said annular spirit tube and adapted to coöperate therewith, said scale being divided into quadrants, each graduated in degrees, a ring for securing said annular tube in position, and supports rigid with the said ring and serving to hold said radial tubes.

7. In a level, a body having an opening therethrough, an annular transparent spirit tube arranged in said opening, scales adapted to coöperate with said spirit tube and mounted on both sides of said body at the edges of said opening, means for securing said spirit tube to said scales, and further spirit tubes arranged at angles with each other and encompassed by said annular spirit tube, all of said spirit tubes being independent of one another.

8. In a level, a body having an opening therethrough provided with outwardly beveled edges, an annular spirit tube arranged within said opening, a ring engaging at the inside of said spirit tube, annular scales arranged at the edges of said opening and connected with said ring, said scales serving to determine the inclination of the level and being inclined toward said spirit tube, further radially arranged and independent spirit tubes encompassed by said annular spirit tube, and means for connecting said further spirit tubes with said ring whereby said further spirit tubes are supported.

9. In a level, a body having an opening therethrough, an annular spirit tube arranged within said opening, a ring of substantially semi-circular section arranged at the inside of said spirit tube and serving to hold the same in position, annular scales arranged at the edges of said opening at both sides of said body, said ring having extensions rigidly connected to said scales, further radially arranged and independent spirit tubes encompassed by said annular spirit tube, a support of substantially semicircular section for each of said further spirit tubes, said supports being rigidly connected with said ring, and means for rigidly connecting the adjacent ends of said supports, each of said supports having an extension embracing its radial spirit tube.

In testimony whereof we have signed our names to this specification in the presence of two subscribing witnesses.

WILSON GEORGE FUESSEL.
FRANK WRIGHT FUESSEL.

Witnesses:
    JEROME STEINERT,
    DAVID STEINERT.